(12) United States Patent
Nakao et al.

(10) Patent No.: US 11,740,197 B2
(45) Date of Patent: Aug. 29, 2023

(54) GAS SENSOR

(71) Applicant: PANASONIC CORPORATION, Osaka (JP)

(72) Inventors: Atsuo Nakao, Nara (JP); Masaya Nakatani, Hyogo (JP); Kiyoshi Toko, Fukuoka (JP); Rui Yatabe, Fukuoka (JP); Bartosz Wyszynski, Fukuoka (JP)

(73) Assignee: PANASONIC HOLDINGS CORPORATION, Osaka (JP)

( * ) Notice: Subject to any disclaimer, the term of this patent is extended or adjusted under 35 U.S.C. 154(b) by 0 days.

(21) Appl. No.: 17/541,843

(22) Filed: Dec. 3, 2021

(65) Prior Publication Data

US 2022/0091059 A1    Mar. 24, 2022

Related U.S. Application Data

(63) Continuation of application No. 16/603,136, filed as application No. PCT/JP2018/012949 on Mar. 28, 2018, now Pat. No. 11,262,324.

(30) Foreign Application Priority Data

Apr. 5, 2017    (JP) .................................. 2017-075344

(51) Int. Cl.
*G01N 27/12*    (2006.01)
*G01N 35/08*    (2006.01)
*G01R 21/06*    (2006.01)

(52) U.S. Cl.
CPC ..................................... *G01N 27/12* (2013.01)

(58) Field of Classification Search
CPC .................. G01N 27/12; G01N 27/126; G01N 2001/2826; G01N 35/08
See application file for complete search history.

(56) References Cited

U.S. PATENT DOCUMENTS 4,674,320 A * 6/1987 Hirschfeld ........... G01N 27/126
                                                    73/31.06
5,140,393 A    8/1992 Hijikihigawa et al.
(Continued)

FOREIGN PATENT DOCUMENTS

CN    1757139 A    4/2006
CN    101349665 A    1/2009
(Continued)

OTHER PUBLICATIONS

International Search Report and Written Opinion issued issued in International Patent Application No. PCT/JP2018/012949, dated Jun. 26, 2018; with partial English translation.

(Continued)

*Primary Examiner* — Jermele M Hollington
*Assistant Examiner* — Temilade S Rhodes-Vivour
(74) *Attorney, Agent, or Firm* — McDermott Will & Emery LLP

(57) ABSTRACT

A gas sensor includes: a substrate; a first conductor and a second conductor that are disposed on the substrate; an insulating layer; and an adsorbent layer. The insulating layer covers the first conductor and the second conductor, and has a first opening that allows a part of a surface of the first conductor to be exposed therethrough and a second opening that allows a part of a surface of the second conductor to be exposed therethrough. The adsorbent layer contains a conductive material and an organic adsorbent that can adsorb a gas. The adsorbent layer is in contact with the first conductor and the second conductor respectively through the first opening and the second opening.

17 Claims, 9 Drawing Sheets

(56) References Cited

U.S. PATENT DOCUMENTS

| | | |
|---|---|---|
| 7,189,360 B1 | 3/2007 | Ho |
| 2004/0202856 A1 | 10/2004 | Blok |
| 2006/0134378 A1 | 6/2006 | Kimura et al. |
| 2007/0234801 A1 | 10/2007 | Weber et al. |
| 2008/0025876 A1 | 1/2008 | Ramamurthy |
| 2008/0056946 A1 | 3/2008 | Ahmad |
| 2010/0072065 A1 | 3/2010 | Naito et al. |
| 2010/0073886 A1 | 3/2010 | Hanazono et al. |
| 2010/0116682 A1 | 5/2010 | Neuzil et al. |
| 2010/0133120 A1 | 6/2010 | Varney et al. |
| 2010/0163429 A1 | 7/2010 | Chiu et al. |
| 2010/0230766 A1 | 9/2010 | Elian et al. |
| 2012/0138459 A1 | 6/2012 | Chen et al. |
| 2012/0266658 A1* | 10/2012 | Akiyama ............ G01N 27/125 977/762 |
| 2015/0308972 A1* | 10/2015 | Akiyama ........... G01N 33/0031 73/31.06 |
| 2015/0362451 A1 | 12/2015 | Hunziker et al. |
| 2016/0084786 A1* | 3/2016 | Suzuki .................. G01N 27/12 73/31.06 |
| 2016/0091457 A1* | 3/2016 | Konno ............... G01N 27/4071 204/427 |
| 2016/0103109 A1 | 4/2016 | Jin et al. |
| 2016/0161445 A1* | 6/2016 | Sakakibara ........ G01N 27/4077 204/424 |
| 2016/0341685 A1 | 11/2016 | Yoshioka et al. |

FOREIGN PATENT DOCUMENTS

| | | |
|---|---|---|
| CN | 101511266 A | 8/2009 |
| CN | 105277594 A | 1/2016 |
| CN | 105510526 A | 4/2016 |
| EP | 2 833 128 A1 | 2/2015 |
| GB | 2 135 781 A | 9/1984 |
| JP | H01-148853 U | 10/1989 |
| JP | H04-286949 A | 10/1992 |
| JP | 2000-193627 A | 7/2000 |
| JP | 2002-071612 A | 3/2002 |
| JP | 2004-340945 A | 12/2004 |
| JP | 2005-114357 A | 4/2005 |
| JP | 2010-503856 A | 2/2010 |
| JP | 2014-016219 A | 1/2014 |
| JP | 2016-217929 A | 12/2016 |
| WO | 2008/009980 A1 | 1/2008 |
| WO | 2008/084582 A1 | 7/2008 |

OTHER PUBLICATIONS

Search Report issued in the corresponding Chinese Application No. 201880023318.8, with English translation.
Xian Ming Dong et al., "Carbon black filled poly(2-ethylhexyl methacrylate) as a candidate for gas sensing material," Journal of Materials Science Letters, 2003, vol. 22, No. 15, pp. 1057-1059.
Extended European Search Report issued in European Patent Application No. 18781639.2, dated May 13, 2020.
Non-Final Office Action issued in U.S. Appl. No. 16/603,136, dated Jun. 25, 2021.
Notice of Allowance issued in U.S. Appl. No. 16/603,136, dated Oct. 5, 2021.
Search Report dated Jan. 5, 2023 issued in the corresponding Chinese Patent Application No. 201880023318.8, with English translation.
European Office Action dated Oct. 13, 2022 issued in the corresponding European Patent Application No. 18781639.2.

\* cited by examiner

GAS SENSOR

CROSS-REFERENCE OF RELATED APPLICATIONS

This application is a Continuation application of U.S. patent application Ser. No. 16/603,136, filed on Oct. 4, 2019, the U.S. National Phase under 35 U.S.C. § 371 of International Patent Application No. PCT/JP2018/012949, filed on Mar. 28, 2018, which in turn claims the benefit of Japanese Application No. 2017-075344, filed on Apr. 5, 2017, the entire disclosures of which Applications are incorporated by reference herein.

TECHNICAL FIELD

The present disclosure relates to a gas sensor.

BACKGROUND ART

Gas sensors are known as equipment for detecting a gas. The gas sensors make it possible to detect a gas easily.

As shown in FIG. 11, a substance detection sensor 300 to detect a gas is described in Patent Literature 1. The substance detection sensor 300 is provided with a conductive layer 330, a first electrode 320 and a second electrode 325. The conductive layer 330 covers each of the first electrode 320 and the second electrode 325.

Use of the substance detection sensor 300 makes it possible to detect a gas as follows. When a gas comes in contact with the conductive layer 330, the conductive layer 330 is swollen. This changes an electric resistance value of the conductive layer 330. It is possible to detect the gas by measuring the change in the electric resistance value of the conductive layer 330.

CITATION LIST

Patent Literature

Patent Literature 1: WO 2008/084582 A1

SUMMARY OF INVENTION

Technical Problem

In some cases, the substance detection sensor 300 described in Patent Literature 1 fails to detect a gas well enough when the gas has a low concentration.

The present disclosure is intended to provide a technology for detecting a gas more reliably.

Solution to Problem

That is, the present disclosure provides a gas sensor including:
a substrate;
a first conductor and a second conductor that are disposed on the substrate;
an insulating layer that covers the first conductor and the second conductor, and that has a first opening that allows a part of a surface of the first conductor to be exposed therethrough and a second opening that allows a part of a surface of the second conductor to be exposed therethrough; and
an adsorbent layer that contains a conductive material and an organic adsorbent that can adsorb a gas, and that is in contact with the first conductor and the second conductor respectively through the first opening and the second opening.

Advantageous Effects of Invention

The gas sensor of the present disclosure makes it possible to detect a gas more reliably.

DESCRIPTION OF EMBODIMENTS

Figure 1:
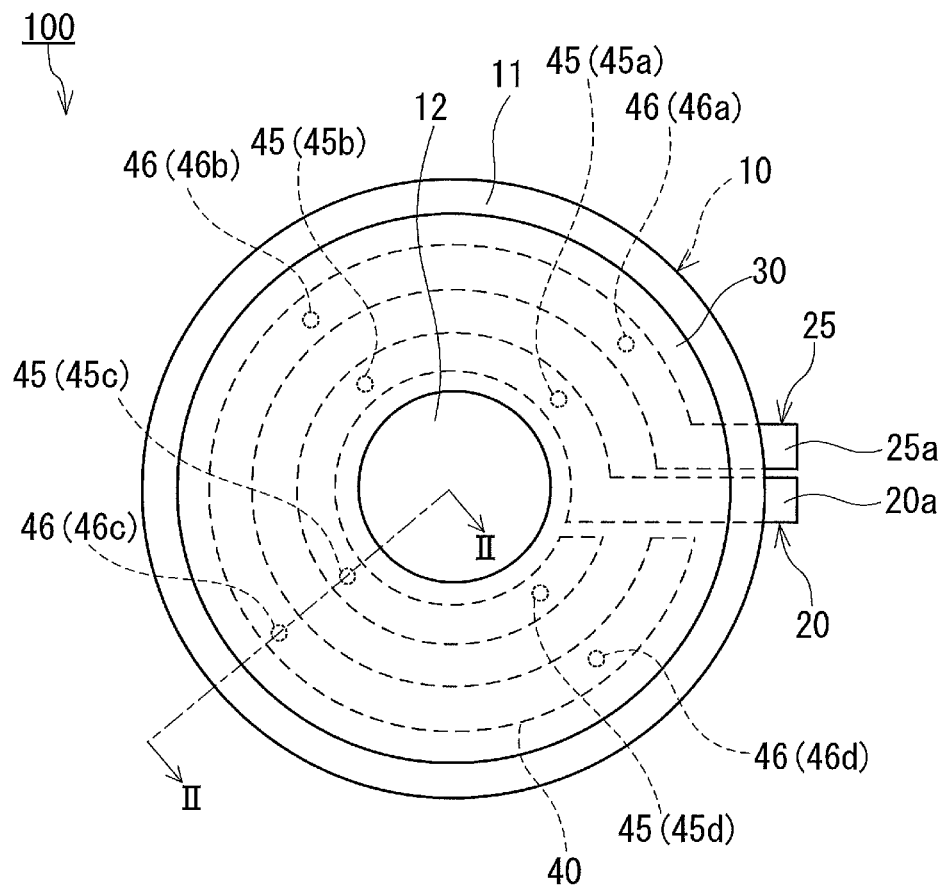
FIG. 1 is a plan view of a gas sensor according to Embodiment 1 of the present disclosure.

The gas sensor according to a first embodiment of the present disclosure includes:
a substrate;
a first conductor and a second conductor that are disposed on the substrate;
an insulating layer that covers the first conductor and the second conductor, and that has a first opening that allows a part of a surface of the first conductor to be exposed therethrough and a second opening that allows a part of a surface of the second conductor to be exposed therethrough; and
an adsorbent layer that contains a conductive material and an organic adsorbent that can adsorb a gas, and that is in contact with the first conductor and the second conductor respectively through the first opening and the second opening.

According to the first embodiment, the adsorbent layer changes in volume when the organic adsorbent adsorbs a gas. To be specific, the adsorbent layer expands or shrinks. The change in volume of the adsorbent layer changes the positional relationship between the conductive materials in the adsorbent layer. Thereby, electric current paths in the adsorbent layer change. In the gas sensor, the first conductor has a surface that is covered with the insulating layer, and no electric current passes from that surface to the adsorbent layer. The second conductor has a surface that is covered with the insulating layer, and no electric current passes from that surface to the adsorbent layer. That is, the number of the electric current paths in the adsorbent layer is small. Therefore, the electric current paths change significantly due to the change in the positional relationship between the conductive materials. The significant change in the electric current paths changes the electric resistance of the adsorbent layer significantly. The significant change in the electric resistance of the adsorbent layer makes it possible to detect a gas more reliably.

In a second embodiment of the present disclosure according to, for example, the first embodiment, the insulating layer has a plurality of the first openings and a plurality of the second openings. The second embodiment makes it possible to detect stably the change in the electric resistance of the adsorbent layer caused by the change in the electric current paths. Thereby, a gas can be detected stably.

In a third embodiment of the present disclosure according to, for example, the gas sensor of the second embodiment, the first openings are arranged in a circular arc shape and the second openings are arranged in a circular arc shape. The third embodiment makes it possible to detect stably the change in the electric resistance of the adsorbent layer caused by the change in the electric current paths. Thereby, a gas can be detected stably.

In a fourth embodiment of the present disclosure according to, for example, the gas sensor of the third embodiment, the adsorbent layer has a circular shape or a ring shape when viewed in plane, the first openings are positioned on a virtual circle that is in a concentric relationship with a virtual circle determined by an outer periphery of the adsorbent layer when the adsorbent layer is viewed in plane, and the second openings are positioned on a virtual circle that is in a concentric relationship with the virtual circle determined by the outer periphery of the adsorbent layer. According to the fourth embodiment, when the adsorbent layer adsorbs a gas, the adsorbent layer expands or shrinks in a radial direction of the virtual circle determined by the outer periphery of the adsorbent layer. The first openings are positioned on the virtual circle that is in a concentric relationship with the virtual circle determined by the outer periphery of the adsorbent layer. Furthermore, the second openings are positioned on the virtual circle that is in a concentric relationship with the virtual circle determined by the outer periphery of the adsorbent layer. Therefore, the variation in the change in the electric current paths is inhibited when the adsorbent layer expands or shrinks. This makes it possible to detect stably the change in the electric resistance of the adsorbent layer caused by the change in the electric current paths. Thereby, a gas can be detected stably.

In a fifth embodiment of the present disclosure according to, for example, the gas sensor of the fourth embodiment, one selected from the first openings and one selected from the second openings are positioned on one of a plurality of virtual straight lines extending radially from a center of the virtual circle determined by the outer periphery of the adsorbent layer. The fifth embodiment makes it possible to detect a gas more stably.

In a sixth embodiment of the present disclosure according to, for example, the gas sensor of the second embodiment, the first openings are arranged linearly and the second openings are arranged linearly. The sixth embodiment makes it possible to detect stably the change in the electric resistance of the adsorbent layer caused by the change in the electric current paths. Thereby, a gas can be detected stably.

In a seventh embodiment of the present disclosure according to, for example, the gas sensor of the sixth embodiment, the adsorbent layer has a rectangular shape when viewed in plane, the first openings are arranged along a direction in which at least one selected from a plurality of outlines constituting an outer periphery of the adsorbent layer extends when the adsorbent layer is viewed in plane, and the second openings are arranged along a direction in which the first openings are arranged. According to the seventh embodiment, when the adsorbent layer adsorbs a gas, the adsorbent layer expands or shrinks in directions in which the outlines constituting the outer periphery of the adsorbent layer extend respectively. The first openings are arranged along the direction in which at least one of the outlines constituting the outer periphery of the adsorbent layer extends. Furthermore, the second openings are arranged along the direction in which the first openings are arranged. Therefore, the variation in the change in the electric current paths is inhibited when the adsorbent layer expands or shrinks. This makes it possible to detect stably the change in the electric resistance of the adsorbent layer caused by the change in the electric current paths. Thereby, a gas can be detected stably.

In an eighth embodiment of the present disclosure according to, for example, the gas sensor of any one of the first embodiment to the seventh embodiment, an entirety of the first opening overlaps with the first conductor when viewed in plane, and an entirety of the second opening overlaps with the second conductor when viewed in plane. The eighth embodiment makes it possible to detect stably the change in the electric resistance of the adsorbent layer caused by the change in the electric current paths. Thereby, a gas can be detected stably.

In a ninth embodiment of the present disclosure according to, for example, the gas sensor of any one of the first embodiment to the eighth embodiment, the organic adsorbent contains at least one selected from the group consisting of polyalkylene glycols, polyesters, silicones, glycerols, nitriles, dicarboxylic acid monoesters and aliphatic amines. According to the ninth embodiment, the organic adsorbent can adsorb a gas easily.

In a tenth embodiment of the present disclosure according to, for example, the gas sensor of any one of the first embodiment to the ninth embodiment, the conductive material contains carbon black. According to the tenth embodiment, the electric resistance of the adsorbent layer changes more significantly when the organic adsorbent changes in volume. Thereby, a gas can be detected more reliably.

In an eleventh embodiment of the present disclosure according to, for example, the gas sensor of the tenth embodiment, a ratio of a weight of the carbon black to a weight of the adsorbent layer is in a range of 0.25 to 0.95. According to the eleventh embodiment, an electric current passes easily to the adsorbent layer from the first conductor or the second conductor. Thereby, the electric resistance of the adsorbent layer can be measured easily.

In a twelfth embodiment of the present disclosure according to, for example, the gas sensor of any one of the first embodiment to the eleventh embodiment, each of the first opening and the second opening has an area in a range of 0.2 to 2000 $\mu m^2$ when viewed in plane. According to the twelfth embodiment, since the number of the electric current paths in the adsorbent layer is sufficiently small, the electric resistance of the adsorbent layer changes more significantly due to the change in the electric current paths. Thereby, a gas can be detected more reliably. Moreover, an electric current passes easily to the adsorbent layer from the first conductor or the second conductor. Thereby, the electric resistance of the adsorbent layer can be measured easily.

In a thirteenth embodiment of the present disclosure according to, for example, the gas sensor of any one of the first embodiment to the twelfth embodiment, each of the first opening and the second opening has a circular shape when viewed in plane, and each of the first opening and the second opening has a diameter in a range of 0.5 to 50 µm. According to the thirteenth embodiment, since the number of the electric current paths in the adsorbent layer is sufficiently small, the electric resistance of the adsorbent layer changes more significantly due to the change in the electric current paths. Thereby, a gas can be detected more reliably. Moreover, an electric current passes easily to the adsorbent layer from the first conductor or the second conductor. Thereby, the electric resistance of the adsorbent layer can be measured easily.

Hereinafter, the embodiments of the present disclosure are described with reference to the drawings. The present disclosure is not limited to the following embodiments.

Embodiment 1

Figure 2:
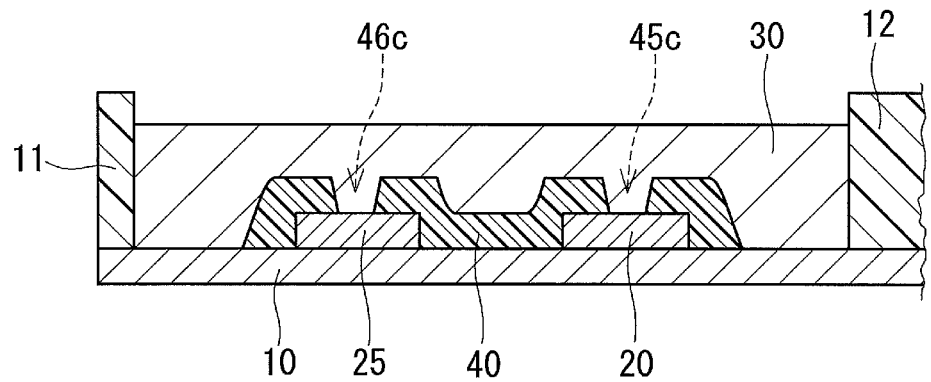
FIG. 2 is a cross-sectional view of the gas sensor shown in FIG. 1, taken along the line II-II.

As shown in FIG. 1 and FIG. 2, a gas sensor 100 according to the present Embodiment 1 includes a substrate 10, a first conductor 20, a second conductor 25, an insulating layer 40 and an adsorbent layer 30. The substrate 10 has a plate-like shape, for example. The substrate 10 has, for example, a rectangular shape or a circular shape when viewed in plane. In the present embodiment, the substrate 10 has a circular shape when viewed in plane. Each of the first conductor 20 and the second conductor 25 functions as an electrode.

The first conductor 20 is disposed on the substrate 10. A lower surface of the first conductor 20 is in contact with an upper surface of the substrate 10. The first conductor 20 has a shape that is not particularly limited. The first conductor 20 has, for example, a circular arc shape or a ring shape when viewed in plane. In the present embodiment, the first conductor 20 has a circular arc shape while having a strip-like shape when viewed in plane. A center of a virtual circle determined by a peripheral surface of the first conductor 20 may or may not coincide with a center of gravity of a surface of the substrate 10 (a center of the upper surface of the substrate 10). The ratio of a distance from the center of gravity of the surface of the substrate 10 to the first conductor 20 to a radius of the surface of the substrate 10 may be in a range of 0.1 to 0.8.

The first conductor 20 includes an exposed portion 20a exposed to the outside of the gas sensor 100. In FIG. 1, the exposed portion 20a extends to the outside of the substrate 10 beyond a peripheral surface of the substrate 10. However, the first conductor 20 may not have a portion extending to the outside of the substrate 10 beyond the peripheral surface of the substrate 10. For example, the substrate 10 may be provided with an opening so that a part of the lower surface of the first conductor 20 is exposed to the outside of the gas sensor 100 through the opening. In this case, the part of the lower surface of the first conductor 20 corresponds to the exposed portion 20a.

The second conductor 25 is disposed on the substrate 10. A lower surface of the second conductor 25 is in contact with the upper surface of the substrate 10. The second conductor 25 has a shape that is not particularly limited. The second conductor 25 surrounds the first conductor 20, for example. That is, the second conductor 25 may be positioned outside of the first conductor 20 in a radial direction of the surface of the substrate 10. The second conductor 25 is out of contact with the first conductor 20. The second conductor 25 has, for example, a circular arc shape or a ring shape when viewed in plane. In the present embodiment, the second conductor 25 has a circular arc shape while having a strip-like shape when viewed in plane. A center of a virtual circle determined by a peripheral surface of the second conductor 25 may or may not coincide with the center of gravity of the surface of the substrate 10. The center of the virtual circle determined by the peripheral surface of the second conductor 25 may or may not coincide with the center of the virtual circle determined by the peripheral surface of the first conductor 20. In the present embodiment, the first conductor 20 and the second conductor 25 are disposed concentrically. The ratio of a distance from the center of gravity of the surface of the substrate 10 to the second conductor 25 to the radius of the surface of the substrate 10 may be in a range of 0.2 to 0.9.

The second conductor 25 includes an exposed portion 25a exposed to the outside of the gas sensor 100. In FIG. 1, the exposed portion 25a extends to the outside of the substrate 10 beyond the peripheral surface of the substrate 10. However, the second conductor 25 may not have a portion extending to the outside of the substrate 10 beyond the peripheral surface of the substrate 10. For example, the substrate 10 may be provided with an opening so that a part of the lower surface of the second conductor 25 is exposed to the outside of the gas sensor 100 through the opening. In this case, the part of the lower surface of the second conductor 25 corresponds to the exposed portion 25a.

The insulating layer 40 covers each of the first conductor 20 and the second conductor 25. The insulating layer 40 is in contact with each of the first conductor 20 and the second conductor 25. The insulating layer 40 may cover an entirety of the upper surface of the substrate 10. The insulating layer 40 may cover the upper surface of the substrate 10 partially.

The insulating layer 40 has a first opening 45 and a second opening 46. The first opening 45 allows a part of a surface of the first conductor 20 to be exposed therethrough. The first opening 45 overlaps with an upper surface of the first conductor 20. For example, an entirety of the first opening 45 overlaps with the first conductor 20 when viewed in plane. The first opening 45 extends through the insulating layer 40 in a thickness direction thereof. The insulating layer 40, excluding the first opening 45, covers an entirety of the upper surface of the first conductor 20 and an entirety of a side surface of the first conductor 20.

The insulating layer 40 may have a plurality of the first openings 45. The number of the first openings 45 is not particularly limited. The number of the first openings 45 may be in a range of 1 to 20, may be in a range of 2 to 8, may be in a range of 2 to 4, and may be in a range of 2 to 3. In the present embodiment, the insulating layer 40 has the first openings 45a, 45b, 45c and 45d. The first openings 45a, 45b, 45c and 45d are arranged in a circular arc shape. In other words, the first openings 45a, 45b, 45c and 45d are arranged along a longitudinal direction of the first conductor 20. To be specific, the first openings 45a, 45b, 45c and 45d are arranged along a circumferential direction of the first conductor 20. In the present embodiment, the first openings 45a, 45b, 45c and 45d are arranged along the circumferential direction of the first conductor 20 at equal intervals.

The second opening 46 allows a part of a surface of the second conductor 25 to be exposed therethrough. The second opening 46 overlaps with an upper surface of the second conductor 25. For example, an entirety of the second opening 46 overlaps with the second conductor 25 when viewed in plane. The second opening 46 extends through the insulating layer 40 in the thickness direction thereof. The insulating layer 40, excluding the second opening 46, covers an entirety of the upper surface of the second conductor 25 and an entirety of a side surface of the second conductor 25.

The insulating layer 40 may have a plurality of the second openings 46. The number of the second openings 46 is not particularly limited. The number of the second openings 46 may be in a range of 1 to 20, may be in a range of 2 to 8, may be in a range of 2 to 4, and may be in a range of 2 to 3. The number of the second openings 46 may be equal to or different from the number of the first openings 45. In the present embodiment, the insulating layer 40 has the second openings 46a, 46b, 46c and 46d. The second openings 46a, 46b, 46c and 46d are arranged in a circular arc shape. In other words, the second openings 46a, 46b, 46c and 46d are arranged along a longitudinal direction of the second conductor 25. To be specific, the second openings 46a, 46b, 46c and 46d are arranged along a circumferential direction of the second conductor 25. In the present embodiment, the second openings 46a, 46b, 46c and 46d are arranged along the circumferential direction of the second conductor 25 at equal intervals.

The first opening 45 and the second opening 46 each has a shape that is not particularly limited. Each of the first opening 45 and the second opening 46 has, for example, a circular shape or a rectangular shape when viewed in plane. Each of the first opening 45 and the second opening 46 may have an area in a range of 0.2 to 200000 μm$^2$, in a range of 0.2 to 2000 μm$^2$, and in a range of 15 to 25 μm$^2$ when viewed in plane. In this case, since the number of the electric current paths in the adsorbent layer 30 is sufficiently small, the electric resistance of the adsorbent layer 30 changes more significantly due to the change in the electric current paths. Thereby, a gas can be detected more reliably. Moreover, an electric current passes easily to the adsorbent layer 30 from the first conductor 20 or the second conductor 25. Thereby, the electric resistance of the adsorbent layer 30 can be measured easily. In the case where each of the first opening 45 and the second opening 46 has a circular shape when viewed in plane, each of the first opening 45 and the second opening 46 may have a diameter in a range of 0.5 to 500 μm, in a range of 0.5 to 50 μm, and in a range of 4.37 to 5.64 μm. The area and the diameter of the first opening 45 and the second opening 46 when viewed in plane can be measured by observing a surface of the insulating layer 40 with an electron microscope.

The adsorbent layer 30 is in contact with the first conductor 20 and the second conductor 25 respectively through the first opening 45 and the second opening 46. For example, as shown in FIG. 1 and FIG. 2, the adsorbent layer 30 is in contact with the first conductor 20 through the first opening 45c. The adsorbent layer 30 is in contact with the second conductor 25 through the second opening 46c. Therefore, an electric current passes to the adsorbent layer 30 when a voltage is applied to the first conductor 20 and the second conductor 25. Thereby, the electric resistance of the adsorbent layer 30 can be measured. The adsorbent layer 30 is disposed on the insulating layer 40. The adsorbent layer 30 covers an entirety of an upper surface of the insulating layer 40 and an entirety of a side surface of the insulating layer 40. The adsorbent layer 30 may cover the upper surface and the side surface of the insulating layer 40 only partially. The adsorbent layer 30 may cover the entirety of the upper surface of the substrate 10, and may cover the upper surface of the substrate 10 partially. The adsorbent layer 30 may or may not be in contact with the substrate 10.

The adsorbent layer 30 has a thickness that is determined in accordance with the type of a gas to be detected, the composition of the adsorbent layer 30, etc. The thinner the adsorbent layer 30 is, the more stably the electric resistance of the adsorbent layer 30 can be measured. The thickness of the adsorbent layer 30 may be in a range of 0.1 to 10 μm. The adsorbent layer 30 has a shape that is not particularly limited. The adsorbent layer 30 has, for example, a circular shape or a ring shape when viewed in plane. In this embodiment, the adsorbent layer 30 has a ring shape when viewed in plane. The adsorbent layer 30 has an area in a range of, for example, 0.002 to 50 mm$^2$ when viewed in plane.

Figure 3:
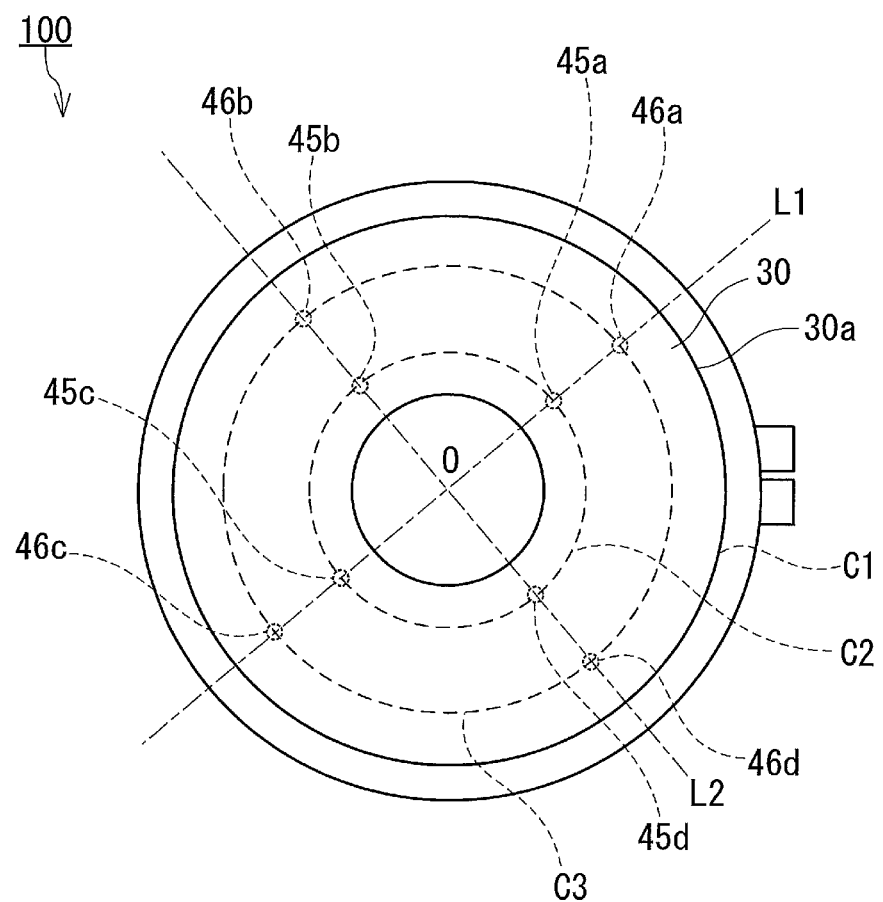
FIG. 3 is a diagram to explain positions of a plurality of first openings and positions of a plurality of second openings in the gas sensor shown in FIG. 1.

As shown in FIG. 3, in the present embodiment, the first openings 45a, 45b, 45c and 45d are positioned on a virtual circle C2 that is in a concentric relationship with a virtual circle C1 determined by an outer periphery 30a of the adsorbent layer 30 when the adsorbent layer 30 is viewed in plane. In FIG. 3, the first conductor 20 and the second conductor 25 are omitted for convenience. The first openings 45a, 45b, 45c and 45d are arranged along the virtual circle C2 at equiangular intervals.

In the present embodiment, when the adsorbent layer 30 is viewed in plane, the second openings 46a, 46b, 46c and 46d are positioned on a virtual circle C3 that is in a concentric relationship with the virtual circle C1. The virtual circle C3 is different from the virtual circle C2. The second openings 46a, 46b, 46c and 46d are arranged along the virtual circle C3 at equiangular intervals.

In the present embodiment, the first openings 45a and 45c and the second openings 46a and 46c are positioned on a virtual straight line L1. The first openings 45b and 45d and the second openings 46b and 46d are positioned on a virtual straight line L2. Each of the virtual straight line L1 and the virtual straight line L2 extends radially from a center O of the virtual circle C1. The virtual straight line L1 is orthogonal to the virtual straight line L2.

As shown in FIG. 1, the gas sensor 100 may further be provided with a first wall 11. The first wall 11 surrounds the surface of the substrate 10. The first wall 11 has a ring shape when viewed in plane. The first wall 11 extends upward (in a thickness direction of the substrate 10) from the substrate 10. The surface of the substrate 10 surrounded by the first wall 11 has a circular shape, for example. The first wall 11 is joined to an outer periphery of the substrate 10. The first wall 11 may be integrated with the substrate 10. In other words, the first wall 11 may be a part of the substrate 10. The first wall 11 extends upward higher than the adsorbent layer 30. The first wall 11 has an inner peripheral surface that is in contact with the adsorbent layer 30.

The gas sensor 100 may further be provided with a second wall 12. The second wall 12 extends upward from a part of the surface of the substrate 10. The second wall 12 has, for example, a circular column shape or a cylindrical shape. The second wall 12 is joined to the part of the surface of the substrate 10. The second wall 12 may be integrated with the substrate 10. In other words, the second walls 12 may be a part of the substrates 10. The second wall 12 is surrounded by the first conductor 20. The second wall 12 has an outer peripheral surface that surrounds the center of gravity of the surface of the substrate 10. The second wall 12 extends upward higher than the adsorbent layer 30. The outer peripheral surface of the second wall 12 is in contact with the adsorbent layer 30. The adsorbent layer 30 is disposed between the first wall 11 and the second wall 12.

A material of the substrate 10 is not particularly limited as long as it allows a shape of the gas sensor 100 to be maintained. Examples of the substrate 10 include an Si substrate, a metal plate, a glass plate and a high polymer film.

A material of the first conductor 20 and a material of the second conductor 25 are not particularly limited as long as they can be applied with a voltage. The first conductor 20 and the second conductor 25 each contain, for example, at least one metal selected from the group consisting of silver, gold, copper, platinum and aluminum. The material of the first conductor 20 may be the same as the material of the second conductor 25.

A material of the insulating layer 40 is not particularly limited as long as it has an insulating property. The material of the insulating layer 40 contains, for example, at least one selected from the group consisting of an insulating polymer material, ceramics and glass. The insulating polymer material contains, for example, at least one selected from the group consisting of polyethylene, polypropylene, polystyrene, polybutadiene, an epoxy resin, a fluororesin, polyvinyl chloride, polymethyl methacrylate, polyamide, polyimide, polycarbonate, cellulose acetate, polyethylene terephthalate, polyethylene naphthalate, polyether sulphone, polyphenylene sulfide and polyether imide. The ceramics contains, for example, at least one selected from the group consisting of $SiO_2$, $Si_3N_4$, $Al_2O_3$, $Zr_2O_3$ and MgO.

The adsorbent layer 30 contains a conductive material and an organic adsorbent. Since the adsorbent layer 30 contains the conductive material, it is possible to pass an electric current through the adsorbent layer 30. By passing an electric current through the adsorbent layer 30, it is possible to measure the electric resistance of the adsorbent layer 30. The conductive material is not particularly limited as long as it has conductivity. The conductive material contains, for example, at least one selected from the group consisting of a carbon material, a conductive polymer, a metal material, a metal oxide, a semiconductor material, a superconductor and a complex compound.

The carbon material contains, for example, at least one selected from the group consisting of carbon black, graphite, coke, carbon nanotube, graphene and fulleren. The conductive polymer contains, for example, at least one selected from the group consisting of polyaniline, polythiophene, polypyrrole and polyacethylene. The metal material contains, for example, at least one selected from the group consisting of silver, gold, copper, platinum and aluminum. The metal oxide contains, for example, at least one selected from the group consisting of an indium oxide, a tin oxide, a tungstic oxide, a zinc oxide and a titanium oxide. The semiconductor material contains, for example, at least one selected from the group consisting of silicon, gallium arsenide, indium phosphide and molybdenum sulfide. The superconductor contains, for example, at least one selected from the group consisting of $YBa_2Cu_3O_7$ and $Tl_2Ba_2Ca_2Cu_3O_{10}$. The complex compound contains, for example, at least one selected from the group consisting of a complex compound of tetramethylparaphenylenediamine and chloranil, a complex compound of tetracyanoquinodimethane and an alkali metal, a complex compound of tetrathiafulvalene and halogen, a complex compound of iridium and a halocarbonyl compound, and tetracyanoplatinum.

Typically, the conductive material contains carbon black. In the case where the conductive material contains carbon black, the electric resistance of the adsorbent layer changes more significantly. Therefore, a gas can be detected more reliably.

Typically, the adsorbent layer 30 contains particles of the conductive material. The particles of the conductive material may have an average particle diameter in a range of 10 to 300 nm. The "average particle diameter" can be measured by the following method. A surface or a cross section of the adsorbent layer 30 is observed with an electron microscope, and an arbitrary number (50, for example) of the particles contained in the adsorbent layer 30 are measured for diameter. An average calculated using the measurements obtained is determined as the average particle diameter. A diameter of a circle having an area equal to that of a particle observed with an electron microscope can be regarded as a particle diameter.

A ratio of a weight of the conductive material to a weight of the adsorbent layer 30 may be in a range of 0.05 to 0.95, and may be in a range of 0.25 to 0.95. The ratio of the weight of the conductive material to the weight of the adsorbent layer 30 may be 0.5. In the case where the conductive material is carbon black, a ratio of a weight of the carbon black to the weight of the adsorbent layer 30 may be in a range of 0.25 to 0.95. In this case, an electric current passes easily to the adsorbent layer 30 from the first conductor 20 or the second conductor 25. Thereby, the electric resistance of the adsorbent layer 30 can be measured easily.

The organic adsorbent can adsorb a gas. The organic adsorbent adsorbs a gas, so that the adsorbent layer 30 changes in volume. A material of the organic adsorbent is determined in accordance with the type of a gas to be detected, the type of the conductive material, etc. Examples of the material of the organic adsorbent include a material marketed as a stationary phase in a column used for gas chromatography. The material of the organic adsorbent contains, for example, at least one selected from the group consisting of a polymer material and a low-molecular material. The organic adsorbent contains, for example, at least one selected from the group consisting of polyalkylene glycols, polyesters, silicones, glycerols, nitriles, dicarboxylic acid monoesters and aliphatic amines. In this case, the organic adsorbent can adsorb a gas easily.

The polyalkylene glycols include polyethylene glycol, for example. The polyesters include, for example, at least one selected from the group consisting of poly(diethylene glycol adipate) and poly(ethylene succinate). The silicones include, for example, at least one selected from the group consisting of dimethyl silicone, phenylmethyl silicone, trifluoropropyl methyl silicone and cyano silicone. The glycerols include diglycerol, for example. The nitriles include, for example, at least one selected from the group consisting of N,N-bis(2-cyanoethyl)formamide and 1,2,3-tris(2-cyanoethoxy)propane. The dicarboxylic acid monoesters include, for example, at least one selected from the group consisting of nitroterephthalic acid modified polyethylene glycol and diethylene glycol succinate. The aliphatic amines include tetrahydroxyethyl ethylenediamine, for example.

A ratio of a weight of the organic adsorbent to the weight of the adsorbent layer 30 is determined in accordance with the type of a gas to be detected, the type of the conductive material, etc. The ratio of the weight of the organic adsorbent to the weight of the adsorbent layer 30 may be in a range of 0.05 to 0.95.

The adsorbent layer 30 may further contain an additive. Examples of the additive include a dispersant.

A material of the first wall 11 and a material of the second wall 12 each are not particularly limited. Each of the material of the first wall 11 and the material of the second wall 12 may have hydrophobicity. Each of the material of the first wall 11 and the material of the second wall 12 contains a hydrophobic polymer material, for example. The hydrophobic polymer material contains, for example, at least one selected from the group consisting of polyethylene, polypropylene, polystyrene, polybutadiene, an epoxy resin and a fluororesin. The material of the first wall 11 may be the same as the material of the second wall 12. The material of the first wall 11 and the material of the second wall 12 each may be the same as the material of the substrate 10.

Next, a method for manufacturing the gas sensor 100 is described.

First, each of the first conductor 20 and the second conductor 25 is disposed on the substrate 10. A method for disposing each of the first conductor 20 and the second conductor 25 on the substrate 10 is not particularly limited. For example, it is possible to dispose each of the first conductor 20 and the second conductor 25 on the substrate 10 by depositing metal on the substrate 10. As a method for depositing the metal, there can be mentioned, for example, a sputtering method, an ion plating method, an electron beam evaporation method, a vacuum evaporation method, a chemical evaporation method and a chemical vapor deposition method.

Next, the insulating layer 40 is produced. A method for producing the insulating layer 40 is not particularly limited. The insulating layer 40 can be produced by the following method, for example. A dispersion liquid containing the insulating polymer material is prepared. The dispersion liquid is obtained by dispersing the insulating polymer material in a coating solvent. Examples of the coating solvent include at least one selected from the group consisting of water and an organic solvent.

The dispersion liquid is applied, in a desired pattern, to each of the first conductor 20 and the second conductor 25 to form a coating film. As a method for forming the coating film, a printing method can be mentioned. The coating film is dried, so that a precursor layer of the insulating layer 40 is formed.

Next, the first opening 45 and the second opening 46 are formed in the precursor layer of the insulating layer 40. Thereby, the insulating layer 40 can be produced. A method for forming the first opening 45 and the second opening 46 is not particularly limited. The first opening 45 and the second opening 46 can be formed by, for example, irradiating the precursor layer of the insulating layer 40 with an ion beam. The first opening 45 and the second opening 46 can also be formed by, for example, etching the precursor layer of the insulating layer 40.

Next, the adsorbent layer 30 is produced. First, a dispersion liquid containing the conductive material and the organic adsorbent is prepared. The dispersion liquid is obtained by dispersing the conductive material and the organic adsorbent in a coating solvent. Examples of the coating solvent include at least one selected from the group consisting of water and an organic solvent. Next, the dispersion liquid is applied to the insulating layer 40 to form a coating film. The coating film is dried, so that the adsorbent layer 30 is formed.

The adsorbent layer 30 formed by the above-mentioned method usually has a thickness that is uniform in a circumferential direction of the surface of the substrate 10. In the gas sensor 100 of the present embodiment, each of the first conductor 20 and the second conductor 25 has a circular arc shape or a ring shape when viewed in plane. Therefore, the adsorbent layer 30 has a thickness that is uniform along the first conductor 20. Similarly, the adsorbent layer 30 has a thickness that is uniform along the second conductor 25. In this case, the electric resistance of the adsorbent layer 30 can be measured stably.

In the case where the gas sensor 100 is provided with the first wall 11 and the second wall 12, the dispersion liquid can be applied uniformly. That is, it is possible for the adsorbent layer 30 to have a uniform thickness. In the case where each of the first wall 11 and the second wall 12 has hydrophobicity, a surface tension generated between the dispersion liquid and the first wall 11 and that generated between the dispersion liquid and the second wall 12 are low. This makes it possible for the adsorbent layer 30 to have a more uniform thickness.

Next, a method for detecting a gas using the gas sensor 100 is described.

First, each of the exposed portion 20a of the first conductor 20 and the exposed portion 25a of the second conductor 25 is connected to a detector. The detector can apply a voltage to the first conductor 20 and the second conductor 25. When a voltage is applied to the first conductor 20 and the second conductor 25, an electric current passes through the adsorbent layer 30. The detector can measure the electric resistance of the adsorbent layer 30 based on the electric current passing through the adsorbent layer 30.

Next, the gas sensor 100 is placed under an atmosphere containing a gas. The gas contains a volatile organic compound, for example. The volatile organic compound contains, for example, at least one selected from the group consisting of ketones, amines, alcohols, aromatic hydrocarbons, aldehydes, esters, organic acid, hydrogen sulfide, methyl mercaptan, disulfide and pyrrole.

When the gas comes in contact with the gas sensor 100, the organic adsorbent contained in the adsorbent layer 30 adsorbs the gas. When the organic adsorbent adsorbs the gas, the adsorbent layer 30 changes in volume. To be specific, the adsorbent layer 30 expands or shrinks. The change in the volume of the adsorbent layer 30 changes the positional relationship between the conductive materials in the adsorbent layer 30. In the gas sensor 100, the first conductor 20 has a surface that is covered with the insulating layer 40, and no electric current passes from that surface to the adsorbent layer 40. The second conductor 25 has a surface that is covered with the insulating layer 40, and no electric current passes from that surface to the adsorbent layer 30. That is, the number of the electric current paths in the adsorbent layer 30 is small. Therefore, the electric current paths change significantly due to the change in the positional relationship between the conductive materials. The significant change in the electric current paths changes the electric resistance of the adsorbent layer 30 significantly. The significant change in the electric resistance of the adsorbent layer 30 makes it possible to detect a gas more reliably. According to the gas sensor 100 of the present embodiment, it is possible to detect a gas even in the case where the gas has a concentration in a range of 0.1 to 1000 ppm.

In the present embodiment, the adsorbent layer 30 has a ring shape when viewed in plane. Therefore, when the adsorbent layer 30 adsorbs the gas, the adsorbent layer 30 expands or shrinks to a radial direction of the virtual circle C1. The first openings 45a, 45b, 45c and 45d are positioned on the virtual circle C2. Furthermore, the second openings 46a, 46b, 46c and 46d are positioned on the virtual circle C3. Since the virtual circles C1, C2 and C3 are in a concentric relationship with each other, the variation in the change in the electric current paths is inhibited when the adsorbent layer 30 expands or shrinks. Particularly, in the present embodiment, since the first openings 45a, 45b, 45c and 45d, and the second openings 46a, 46b, 46c and 46d are positioned on the virtual straight line L1 or the virtual straight line L2, the variation in the change in the electric current paths is more inhibited. This makes it possible to detect stably the change in the electric resistance of the adsorbent layer 30 caused by the change in the electric current paths. Thereby, the gas sensor 100 can detect a gas stably.

Next, a gas sensor assembly according to the present embodiment is described.

Figure 4:
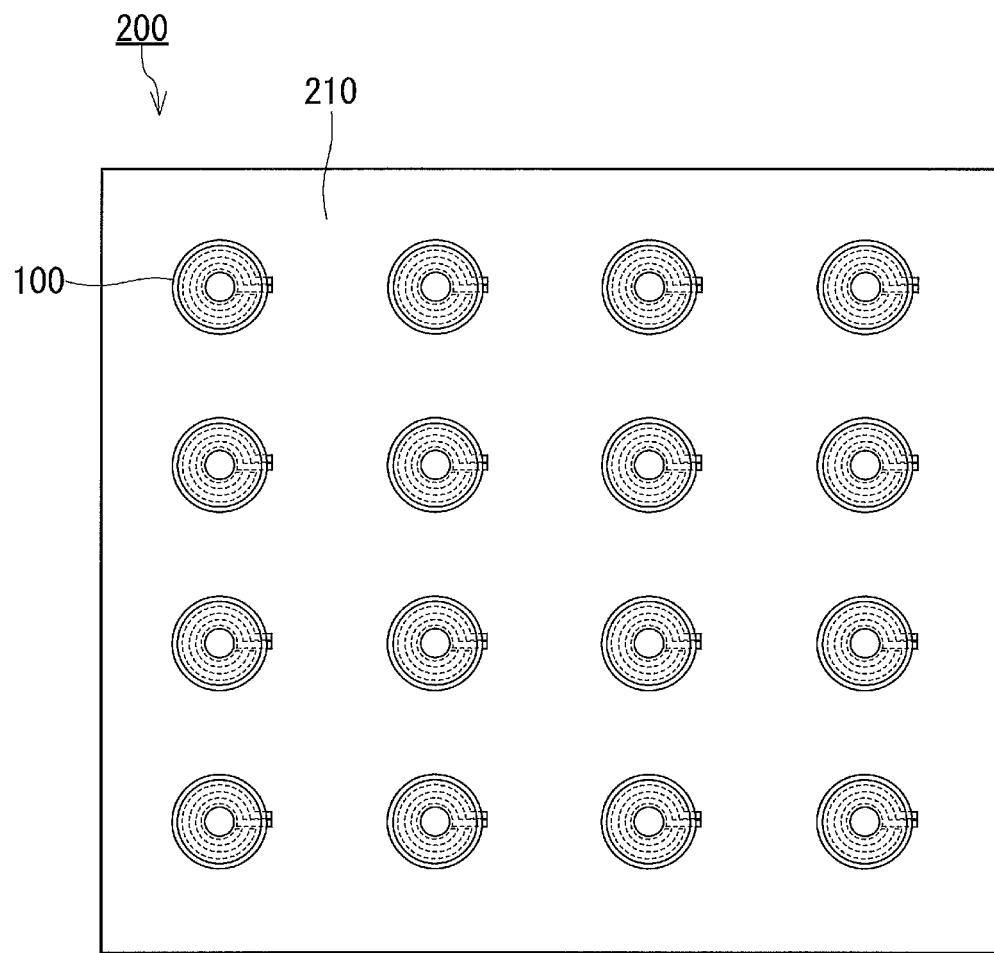
FIG. 4 is a plan view of a gas sensor assembly according to one embodiment of the present disclosure.

As shown in FIG. 4, a gas sensor assembly 200 is provided with a plurality of the gas sensors 100 and a substrate 210. The substrate 210 has a plate-like shape, for example. The substrate 210 has, for example, a rectangular shape when viewed in plane. The substrate 210 has two pairs of end faces; one pair of end faces face each other, and the other pair of end faces face each other.

Each of the gas sensors 100 is disposed on the substrate 210. Each of the gas sensors 100 is connected to a detector (not shown). The respective adsorbent layers 30 of at least two selected from the gas sensors 100 may be composed of the same material. In this case, the gas sensor assembly 200 has higher detection accuracy against a specific gas. The respective adsorbent layers 30 of at least two selected from the gas sensors 100 may be composed of different materials, respectively. The adsorbent layers 30 of the gas sensors 100 may contain the different organic adsorbents, respectively. In this case, the gas sensors 100 respectively exhibit different behaviors against a specific gas. For example, a gas that is unlikely to be adsorbed by a specific one of the specific gas sensors 100 is adsorbed by one of the other gas sensors 100. Thereby, the gas sensor assembly 200 can detect a mixed gas containing a plurality of gases.

The number of the gas sensors 100 that the gas sensor assembly 200 has is not particularly limited. The number of the gas sensors 100 is 16, for example. In FIG. 4, four units of the gas sensors 100 are arranged in a direction from one end face toward the other end face of one of the pairs of the end faces of the substrate 210. Four units of the gas sensors 100 are arranged in a direction from one end face toward the other end face of the other pair of the end faces of the substrate 210.

Modification of Embodiment 1

Figure 5:
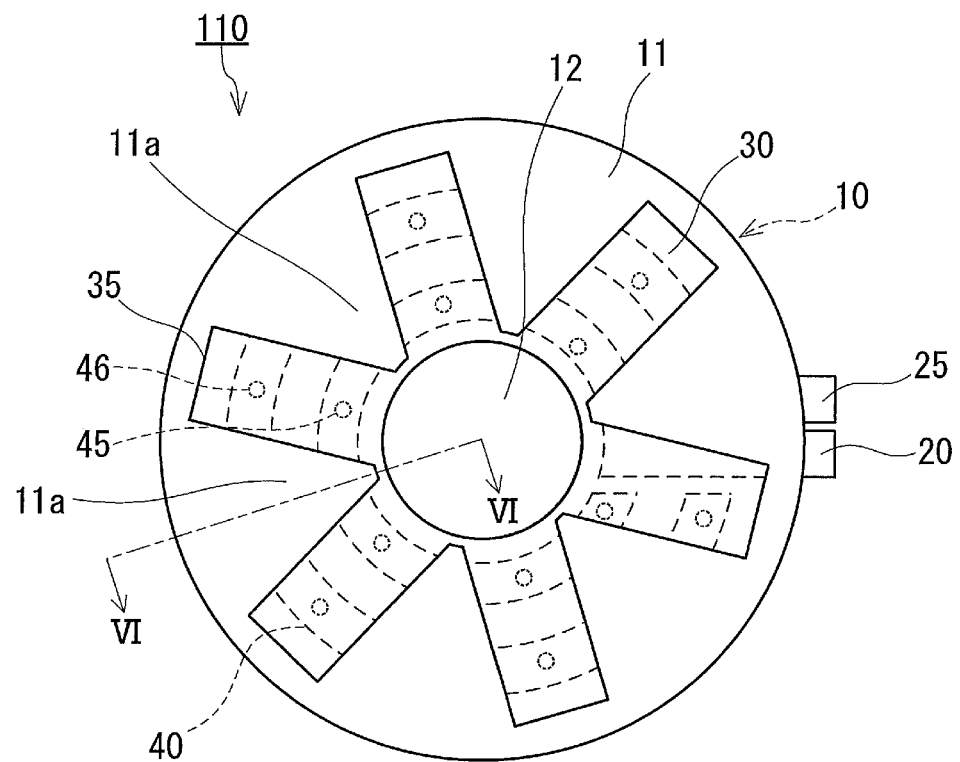
FIG. 5 is a plan view of a gas sensor according to a modification of Embodiment 1 of the present disclosure.

The surface of the substrate 10 surrounded by the first wall 11 may not have a circular shape. In a gas sensor 110 in FIG. 5, the first wall 11 includes a plurality of projecting portions 11a. Each of the projecting portions 11a projects from the outer periphery of the substrate 10 toward the center of gravity of the surface of substrate 10. Each of the projecting portions 11a has a fan shape when viewed in plane. The surface of the substrate 10 surrounded by the first wall 11 has a gear shape, for example. The number of the projecting portions 11a is not particularly limited. The number of the projecting portions 11a is 6, for example. In FIG. 5, each of the projecting portions 11a is out of contact with the second wall 12. However, each of the projecting portions 11a may be in contact with the second wall 12.

Figure 6:
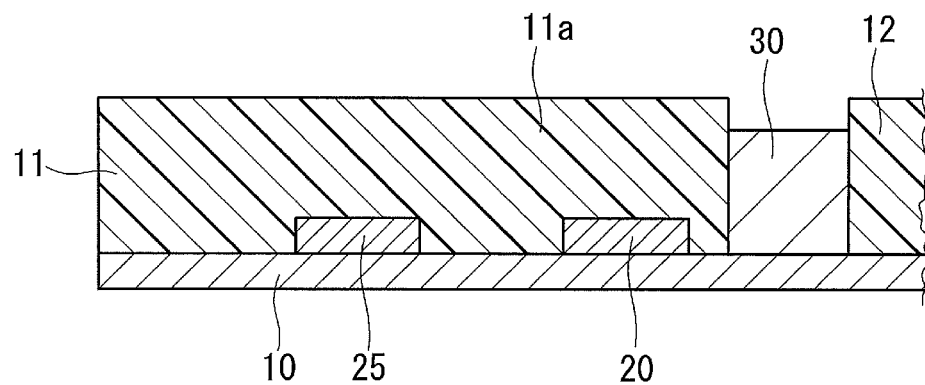
FIG. 6 is a cross-sectional view of the gas sensor shown in FIG. 5, taken along the line VI-VI.

As shown in FIG. 6, each of the projecting portions 11a covers partially the upper surface and the side surface of the first conductor 20. Each of the projecting portions 11a covers partially the upper surface and the side surface of the second conductor 25. Each of the projecting portions 11a is in contact with the first conductor 20 and the second conductor 25. The first conductor 20 has portions that are covered respectively with the projecting portions 11a and that are out of contact with the insulating layer 40 and the adsorbent layer 30. The second conductor 25 has portions that are covered respectively with the projecting portions 11a and that are out of contact with the insulating layer 40 and the adsorbent layer 30. However, the portions that the first conductor 20 has and that are covered respectively with the projecting portions 11a and the portions that the second conductor 25 has and that are covered respectively with the projecting portions 11a may be covered with the insulating layer 40.

As shown in FIG. 5, a detecting section 35 is formed between two projecting portions 11a adjacent to each other in the circumferential direction of the surface of the substrate 10. The gas sensor 110 typically has the same number of the detecting sections 35 as the number of the projecting portions 11a. In each of the detecting sections 35, the insulating layer 40 covers each of the first conductor 20 and the second conductor 25. The insulating layer 40 has one first opening 45 and one second opening 46 in one detecting section 35. In one detecting section 35, the adsorbent layer 30 is in contact with the first conductor 20 and the second conductor 25 respectively through the first opening 45 and the second opening 46. In each of the detecting sections 35, the electric resistance of the adsorbent layer 30 can be measured.

In the production of the adsorbent layer 30 of the gas sensor 110, the dispersion liquid can be applied more uniformly in each of the detecting sections 35. That is, it is possible for the adsorbent layer 30 to have a more uniform thickness in the gas sensor 110.

Embodiment 2

Figure 7:
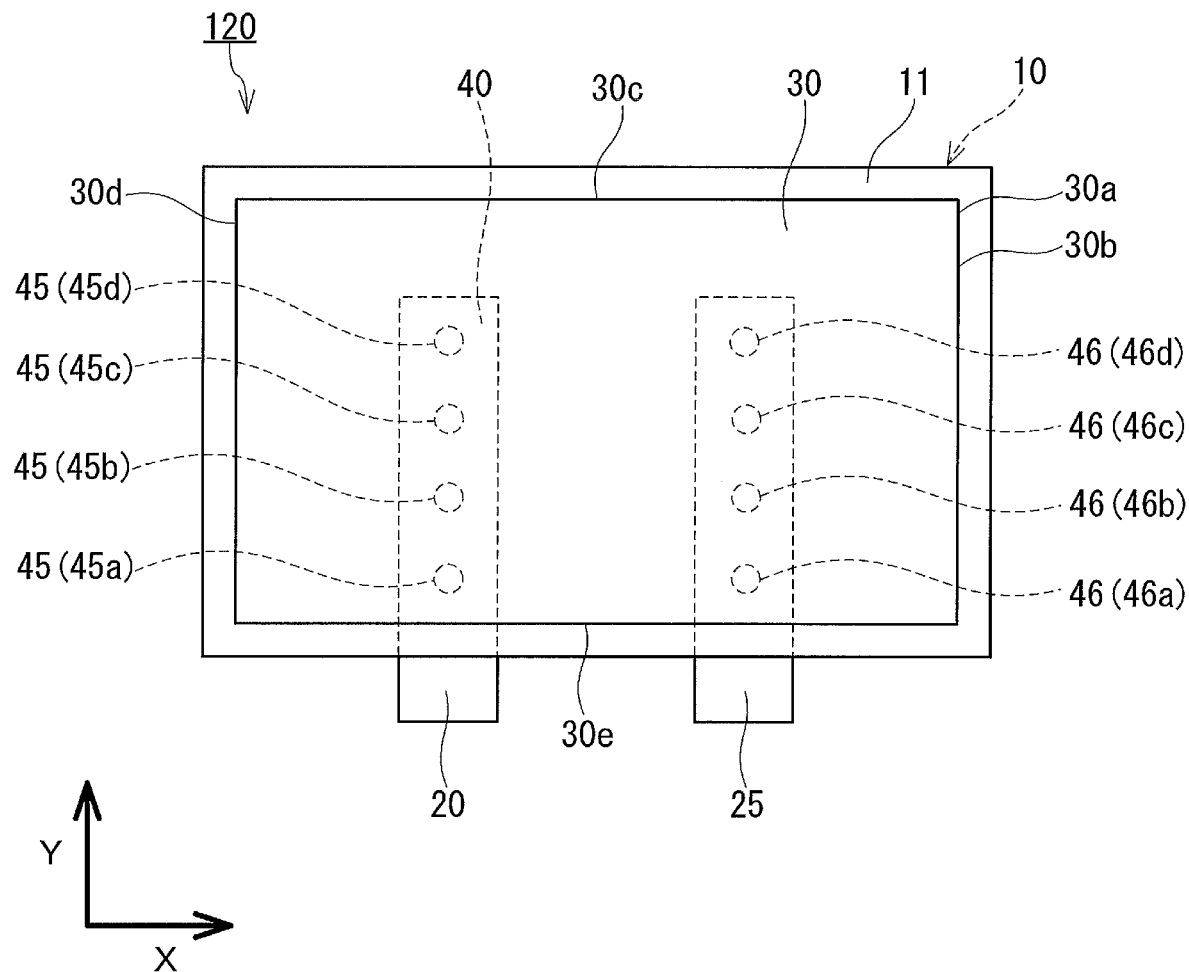
FIG. 7 is a plan view of a gas sensor according to Embodiment 2.

The first conductor 20 may not have a circular arc shape or a ring shape when viewed in plane. Also, the second conductor 25 may not surround the first conductor 20. Furthermore, the adsorbent layer 30 may not have a circular shape or a ring shape when viewed in plane. In a gas sensor 120 in FIG. 7, the first conductor 20 has a rectangular shape as well as a strip-like shape when viewed in plane. The second conductor 25 has a rectangular shape as well as a strip-like shape when viewed in plane. The adsorbent layer 30 has a rectangular shape when viewed in plane. In the present embodiment, the adsorbent layer 30 has a strip-like shape. The substrate 10 has a rectangular shape when viewed in plane. The gas sensor 120 is not provided with the second wall 12. The gas sensor 120 has a structure identical to that of the gas sensor 100 of Embodiment 1 except the shape of the first conductor 20, the shape of the second conductor 25, the shape of the adsorbent layer 30, the shape of the substrate 10, and the presence or absence of the second wall 12. Therefore, elements that are common between the gas sensor 100 of Embodiment 1 and the gas sensor 120 of the present embodiment are designated by the same reference numerals and the descriptions thereof may be omitted. That is, the descriptions about each of the following embodiments may be applied interchangeably unless they are technically contradictory. Furthermore, the embodiments may be used in combination unless they are technically contradictory.

A plurality of outlines 30b, 30c, 30d and 30e constitute the outer periphery 30a of the adsorbent layer 30. The outlines 30b and 30d face each other. The outlines 30c and 30e face each other. Each of the outlines 30c and 30e extends in a first direction X. Each of the outlines 30b and 30d extends in a second direction Y. The first direction X is orthogonal to the second direction Y.

Each of the first conductor 20 and the second conductor 25 extends in the second direction Y. The first conductor 20 and the second conductor 25 are arranged in the first direction X.

The first openings 45a, 45b, 45c and 45d are arranged linearly along the second direction Y. In other words, the first openings 45a, 45b, 45c and 45d are arranged along a longitudinal direction of the first conductor 20. In the present embodiment, the first openings 45a, 45b, 45c and 45d are arranged along the second direction Y at equal intervals.

The second openings 46a, 46b, 46c and 46d are arranged linearly along the second direction Y. In other words, the second openings 46a, 46b, 46c and 46d are arranged along a longitudinal direction of the second conductor 25. In the present embodiment, the second openings 46a, 46b, 46c and 46d are arranged along the second direction Y at equal intervals. At least one selected from the first openings 45 and at least one selected from the second openings 46 may be arranged along the first direction X. In the present embodiment, the first opening 45a and the second opening 46a are arranged along the first direction X. The first opening 45b and the second opening 46b are arranged along the first direction X. The first opening 45c and the second opening 46c are arranged along the first direction X. The first opening 45d and the second opening 46d are arranged along the first direction X.

The gas sensor 120 of the present embodiment is not provided with the second wall 12. However, the gas sensor 120 may be provided with the second wall 12. In this case, the second wall 12 may have a prism shape. In the case where the gas sensor 120 is provided with the second wall 12, the adsorbent layer 30 has a frame shape when viewed in plane.

In the present embodiment, the adsorbent layer 30 has a rectangular shape when viewed in plane. Therefore, when the adsorbent layer 30 adsorbs a gas, the adsorbent layer 30 expands or shrinks in the first direction X as well as in the second direction Y. Also, the adsorbent layer 30 expands or shrinks in a direction opposite to the first direction X as well as in a direction opposite to the second direction Y. The first openings 45a, 45b, 45c and 45d are arranged along the second direction Y. Furthermore, the second openings 46a, 46b, 46c and 46d are also arranged along the second direction Y. Therefore, the variation in the change in the electric current paths is inhibited when the adsorbent layer 30 expands or shrinks. This makes it possible to detect stably the change in the electric resistance of the adsorbent layer 30 caused by the change in the electric current paths. Thereby, the gas sensor 100 can detect a gas stably.

Embodiment 3

Figure 8:
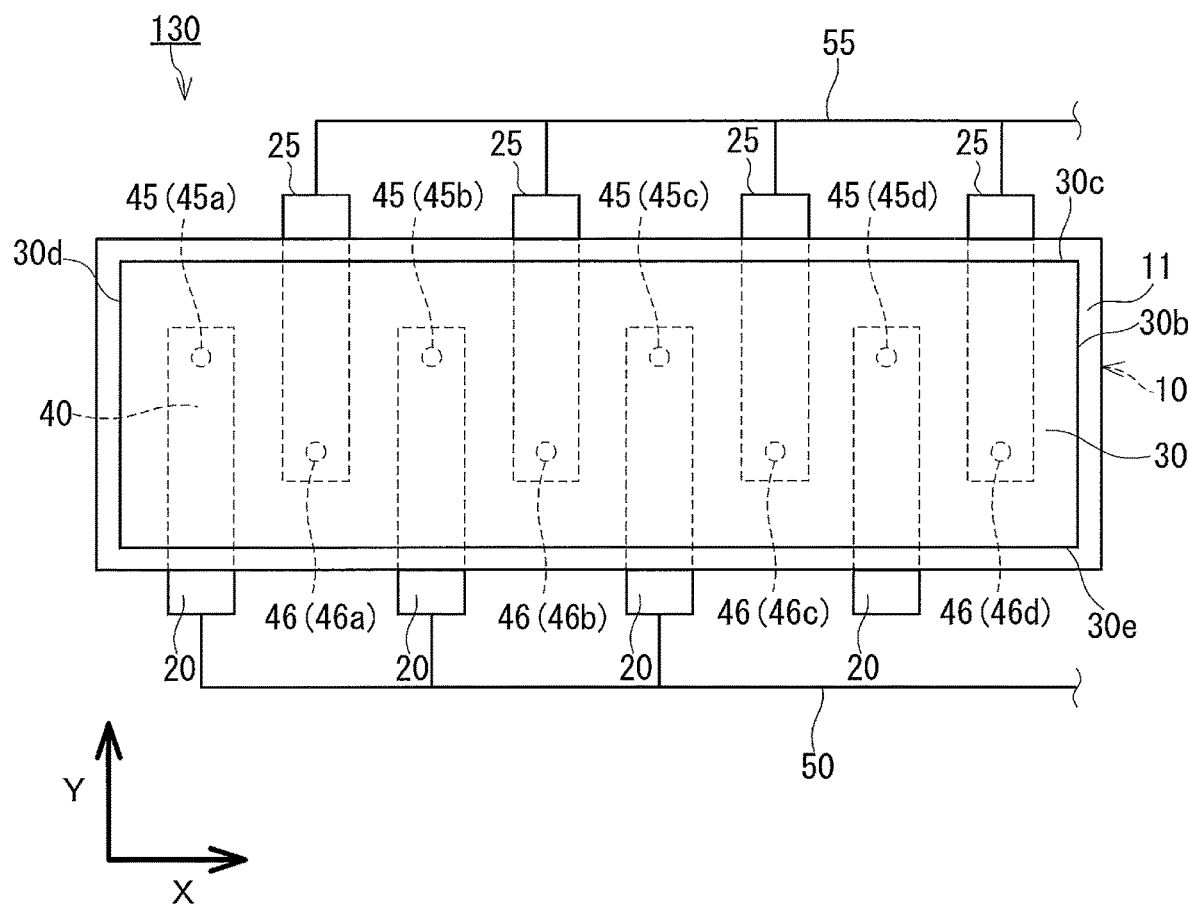
FIG. 8 is a plan view of a gas sensor according to Embodiment 3.

The gas sensor 120 of Embodiment 2 may be provided with a plurality of the first conductors 20 and a plurality of the second conductors 25. Each of the first conductors 20 may have one first opening 45. Each of the second conductors 25 may have one second opening 46. In a gas sensor 130 in FIG. 8, each of the first conductors 20 extends in the second direction Y. The first conductors 20 are connected electrically to each other with a wiring 50. The number of the first conductors 20 may be in a range of 2 to 10.

Each of the second conductors 25 extends in the direction opposite to the second direction Y. The second conductors 25 are connected electrically to each other with a wiring 55. The first conductors 20 and the second conductors 25 are arranged alternately in the first direction X. The number of the first conductors 25 may be in a range of 2 to 10.

The first openings 45a, 45b, 45c and 45d are arranged linearly along the first direction X. In the present embodiment, the first openings 45a, 45b, 45c and 45d are arranged along the first direction X at equal intervals. The second openings 46a, 46b, 46c and 46d are arranged linearly along the first direction X. In the present embodiment, the second openings 46a, 46b, 46c and 46d are arranged along the first direction X at equal intervals.

In the present embodiment, the adsorbent layer 30 has a rectangular shape when viewed in plane. Therefore, when the adsorbent layer 30 adsorbs a gas, the adsorbent layer 30 expands or shrinks in the first direction X as well as in the second direction Y. Also, the adsorbent layer 30 expands or shrinks in the direction opposite to the first direction X as well as in the direction opposite to the second direction Y. The first openings 45a, 45b, 45c and 45d are arranged along the first direction X. Furthermore, the second openings 46a, 46b, 46c and 46d are also arranged along the first direction X. Therefore, the variation in the change in the electric current paths is inhibited when the adsorbent layer 30 expands or shrinks. This makes it possible to detect stably the change in the electric resistance of the adsorbent layer 30 caused by the change in the electric current paths. Thereby, the gas sensor 100 can detect a gas stably.

The adsorbent layer 30 may not have the shapes indicated in Embodiments 1 to 3. The adsorbent layer 30 may have a wire-like shape, a fence-like, or a mesh-like shape. In this case, the adsorbent layer 30 covers partially each of the first conductor 20 and the second conductor 25. Therefore, even in the case where the gas sensor is not provided with the insulating layer 40, the number of the electric current paths in the adsorbent layer 30 is small. According to the adsorbent layer 30 thus provided, the electric resistance of the adsorbent layer 30 changes significantly even in the case where the gas sensor is not provided with the insulating layer 40. Thereby, a gas can be detected more reliably.

EXAMPLES

The present disclosure is described in detail with reference to examples. However, the present disclosure is not limited in any way by the following examples.

(Sample 1)

First, the first conductor and the second conductor each were disposed on the substrate. Each of the first conductor and the second conductor was made of platinum. The Si substrate was used as the substrate. Each of the first conductor and the second conductor had a circular arc shape when viewed in plane. The second conductor surrounded the first conductor.

Next, each of the first conductor and the second conductor was covered with the precursor layer of the insulating layer. The precursor layer was made of $SiO_2$. The precursor layer was provided with one first opening and one second opening so as to produce the insulating layer. Each of the first opening and the second opening had a circular shape when viewed in plane. Each of the first opening and the second opening had a diameter of 5 μm when viewed in plane. That is, each of the first opening and the second opening had an area of 20 μm$^2$.

Next, the insulating layer was applied with the dispersion liquid containing the conductive material and the organic adsorbent to form the coating film. Carbon black was used as the conductive material. Polyethylene glycol was used as the organic adsorbent. The coating film was dried to form the adsorbent layer. The ratio of the weight of the conductive material to the weight of the adsorbent layer was 0.5. The adsorbent layer had a ring shape when viewed in plane. Thus, a gas sensor of Sample 1 was obtained.

(Sample 2)

A gas sensor of Sample 2 was obtained by the same method as that of Example 1, except that the precursor layer of the insulating layer was provided with four first openings and four second openings so as to produce the insulating layer.

(Sample 3)

A gas sensor of Sample 3 was obtained by the same method as that of Example 1, except that the precursor layer of the insulating layer was provided with eight first openings and eight second openings so as to produce the insulating layer.

(Sample 4)

A gas sensor of Sample 4 was obtained by the same method as that of Example 1, except that the precursor layer of the insulating layer was provided with 16 first openings and 16 second openings so as to produce the insulating layer.

(Sample 5)

A gas sensor of Sample 5 was obtained by the same method as that of Example 1, except that the insulating layer was not produced.

(Measurement of the Rate of Change in Electric Resistance)

Samples 1 to 5 were placed under an atmosphere containing gaseous nonanal, and the adsorbent layer of each of Samples 1 to 5 was measured for the rate of change in electric resistance. The electric resistance of the adsorbent layer before the adsorbent layer adsorbed nonanal was defined as $R_1$. The electric resistance of the adsorbent layer after the adsorbent layer adsorbed nonanal was defined as $R_2$. The difference between $R_1$ and $R_2$ was defined as $\Delta R$. A rate C (%) of change in electric resistance was a value calculated by $\Delta R/R_1 \times 100$. The nonanal had a concentration of 0.8 ppm.

Figure 9:
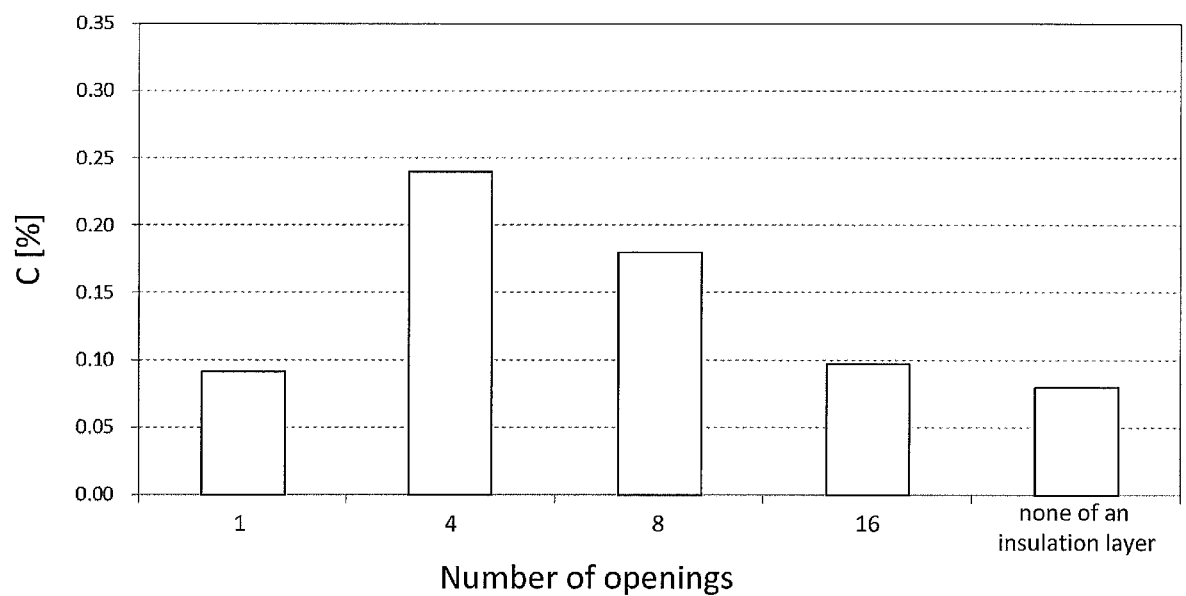
FIG. 9 is a graph showing a rate of change in electric resistance of an adsorbent layer in each of Samples 1 to 5.

As shown in FIG. 9, the gas sensors of Samples 1 to 4 had a rate C of change higher than that of the gas sensor of Sample 5. The horizontal axis of the graph in FIG. 9 indicates the number of the first openings. With the rate C of change of Sample 5, the gas fails to be detected in some cases. As can be seen from FIG. 9, the gas sensors of the present embodiments can detect the gas more reliably.

The smaller the number of the first openings and the number of the second openings are, the smaller the number of the electric current paths in the adsorbent layer becomes. The graph in FIG. 9 indicates that the smaller the number of the electric current paths in the adsorbent layer is, the higher the rate C of change in the electric resistance of the adsorbent layer becomes. On the other hand, however, the value of the rate C of change decreased when the number of the first openings and the number of the second openings are less than a specific value, as can be seen from the measurement result of Sample 1.

(Sample 6)

A gas sensor of Sample 6 was obtained by the same method as that of Example 1, except that: four conductors having a rectangular shape when viewed in plane were used as the first conductors and four conductors having a rectangular shape when viewed in plane were used as the second conductors; the first conductors and the second conductors were arranged alternately in a direction orthogonal to a thickness direction of the substrate; each of the first conductors was provided with one first opening; each of the second conductors was provided with one second opening; and the adsorbent layer had a rectangular shape when viewed in plane.

(Sample 7)

A gas sensor of Sample 7 was obtained by the same method as that of Example 6, except that: one conductor having a rectangular shape when viewed in plane was used as the first conductor and one conductor having a rectangular shape when viewed in plane was used as the second conductor; the first conductor was provided with four first openings; and the second conductor was provided with four second openings.

(Measurement of the Rate of Change in Electric Resistance)

Samples 2, 6 and 7 were placed under an atmosphere containing gaseous nonanal, and the adsorbent layer of each of Samples 2, 6 and 7 was measured for the rate C (%) of change in electric resistance. The nonanal had a concentration of 0.8 ppm.

Figure 10:
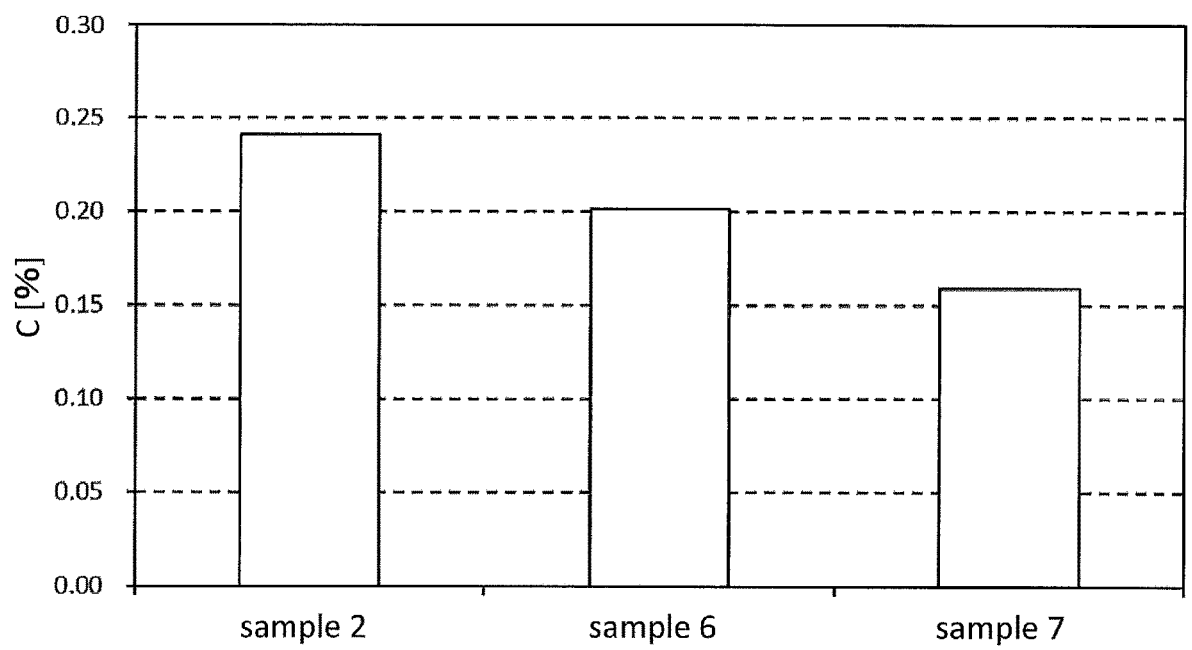
FIG. 10 is a graph showing a rate of change in electric resistance of an adsorbent layer in each of Samples 2, 6 and 7.
Figure 11:
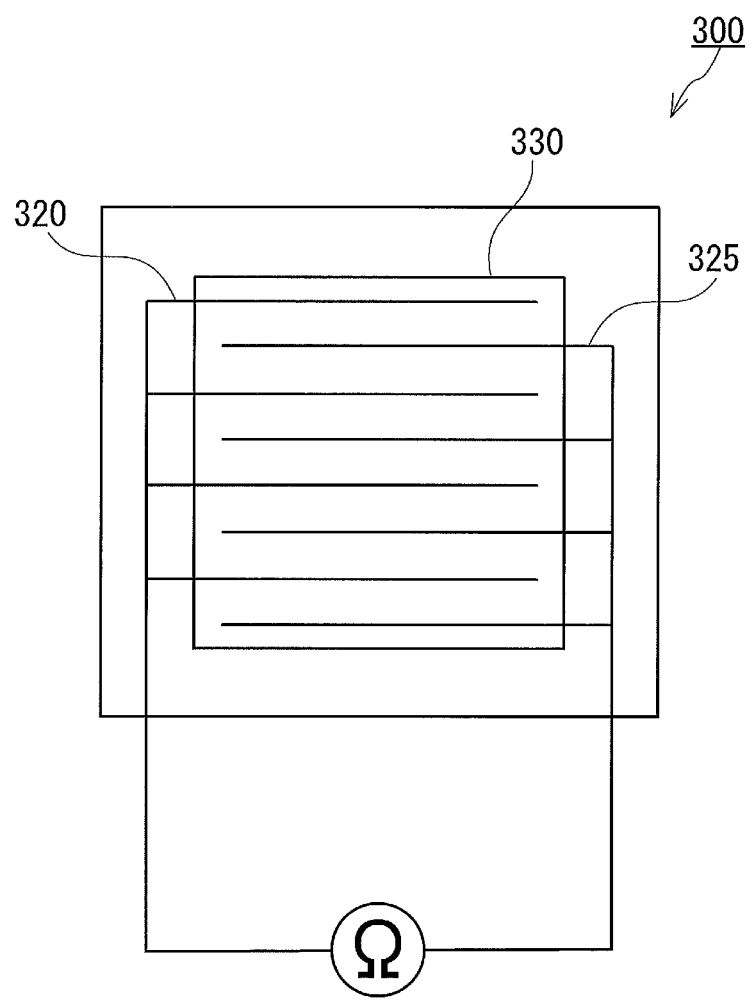
FIG. 11 is a plan view of a conventional gas sensor.

As shown in FIG. 10, the gas sensor of Sample 2 had a rate C of change higher than those of the other gas sensors. This result reveals that the gas sensor can detect the gas more reliably when the conditions that the adsorbent layer has a ring shape when viewed in plane, the first openings are arranged in a circular arc shape, and the second openings are arranged in a circular arc shape are satisfied.

INDUSTRIAL APPLICABILITY

The technology disclosed in the present description is useful for detection of a gas, etc.

The invention claimed is:

1. A gas sensor comprising:
    a substrate;
    a first conductor and a second conductor that are disposed on the substrate;
    an adsorbent layer that contains a conductive material and an organic adsorbent that can adsorb a gas, and that is in contact with the first conductor and the second conductor respectively; and
    a first wall that surrounds a surface of the substrate and that is in contact with the adsorbent layer.

2. The gas sensor according to claim 1, wherein a material of the first wall has hydrophobicity.

3. The gas sensor according to claim 1, wherein the first wall extends upward higher than the adsorbent layer.

4. The gas sensor according to claim 1, further comprising a second wall that extends upward from a part of the surface of the substrate.

5. The gas sensor according to claim 4, wherein the second wall has hydrophobicity.

6. The gas sensor according to claim 4, wherein the second wall extends upward higher than the adsorbent layer.

7. The gas sensor according to claim 4, wherein the second wall has a circular column shape or a cylindrical shape.

8. The gas sensor according to claim 1, wherein the first wall has a ring shape when viewed in plane.

9. The gas sensor according to claim 1, wherein the first wall includes a projecting portion that projects from an outer periphery of the substrate toward a center of gravity of the surface of the substrate.

10. The gas sensor according to claim 9, wherein the projecting portion covers partially the first conductor and the second conductor respectively.

11. The gas sensor according to claim 1, wherein the adsorbent layer has a circular shape or a ring shape when viewed in plane,
    the first conductor has a circular arc shape or a ring shape when viewed in plane, and
    the second conductor has a circular arc shape or a ring shape when viewed in plane.

12. The gas sensor according to claim 11, wherein the second conductor surrounds the first conductor.

13. The gas sensor according to claim 1, wherein the substrate is an Si substrate, a metal plate, or a glass plate.

14. The gas sensor according to claim 1, wherein the organic adsorbent contains at least one selected from the group consisting of polyalkylene glycols, polyesters, silicones, glycerols, nitriles, dicarboxylic acid monoesters and aliphatic amines.

15. The gas sensor according to claim 1, wherein the conductive material contains carbon black.

16. The gas sensor according to claim 15, wherein a ratio of a weight of the carbon black to a weight of the adsorbent layer is in a range of 0.25 to 0.95.

17. A gas sensor comprising:
- a substrate;
- a first conductor and a second conductor that are disposed on the substrate;
- an insulating layer that covers the first conductor and the second conductor, and that has a first opening that allows a part of a surface of the first conductor to be exposed therethrough and a second opening that allows a part of a surface of the second conductor to be exposed therethrough;
- an adsorbent layer that contains a conductive material and an organic adsorbent that can adsorb a gas, and that is in contact with the first conductor and the second conductor respectively through the first opening and the second opening; and
- a wall that surrounds a surface of the substrate and that is in contact with the adsorbent layer.

* * * * *